Figure 1:
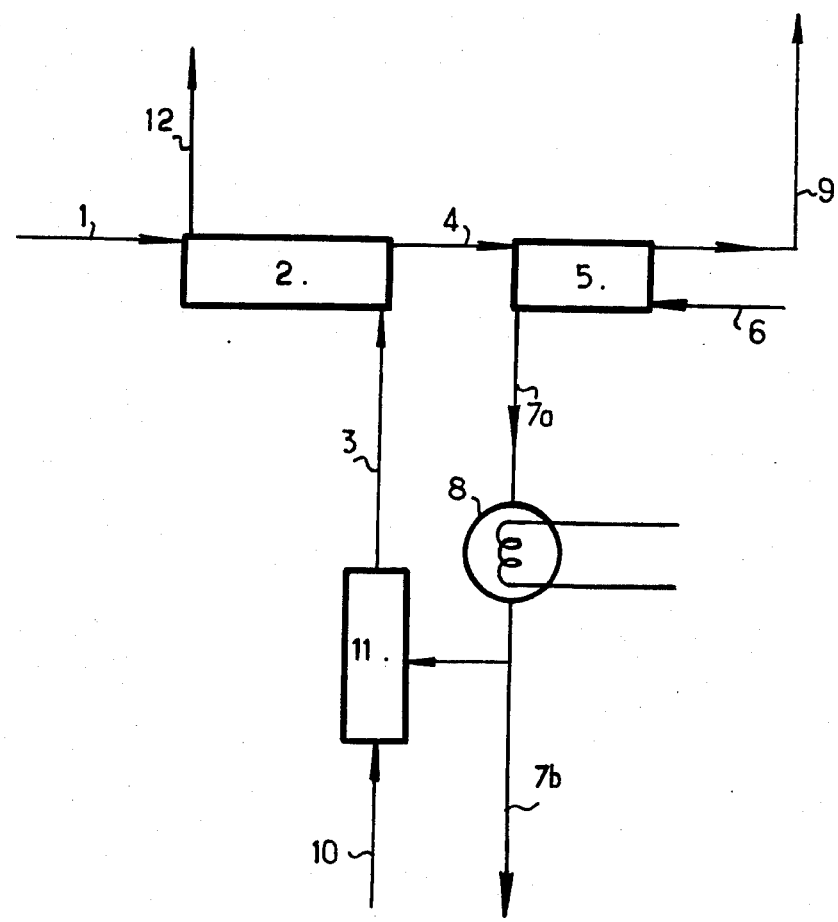

United States Patent [19]

Leroy et al.

[11] 4,065,547
[45] Dec. 27, 1977

[54] METHOD OF DEFLUORINATING PHOSPHORIC ACID

[75] Inventors: Maurice Leroy, Saint-Germain-en-Laye; Jacques Helgorsky, Frepillon, both of France

[73] Assignee: Rhone-Poulenc Industries, Paris, France

[21] Appl. No.: 603,732

[22] Filed: Aug. 11, 1975

[30] Foreign Application Priority Data

Aug. 13, 1974 France .................................. 74.28029

[51] Int. Cl.$^2$ ............................................. C01B 25/16
[52] U.S. Cl. .............................. 423/321 S; 423/321 R
[58] Field of Search ....................... 423/321, 321 S, 320

[56] References Cited

U.S. PATENT DOCUMENTS

| 3,361,527 | 1/1968 | Hinkebein et al. | 423/321 S |
| 3,410,656 | 11/1968 | Bunin et al. | 423/321 S |
| 3,458,282 | 7/1969 | Koerner et al. | 423/321 S |
| 3,479,139 | 11/1969 | Koerner et al. | 423/321 S |
| 3,607,029 | 9/1971 | Goret et al. | 423/321 S |
| 3,867,511 | 2/1975 | Chiang et al. | 423/321 S |

Primary Examiner—Earl C. Thomas
Assistant Examiner—Eugene T. Wheelock
Attorney, Agent, or Firm—McDougall, Hersh & Scott

[57] ABSTRACT

A method for the removal of fluorine compounds from admixture with phosphoric acid in which the mixture in organic solvent is contacted with an aqueous solution of a compound of Al, Fe, Ti or Zr whereby the phosphoric acid remains in the organic solvent phase while the fluorine compounds are extracted in the aqueous phase, and then regenerating the organic solvent phase with water to remove phosphoric acid from the solvent phase.

13 Claims, 2 Drawing Figures

FIG. I

METHOD OF DEFLUORINATING PHOSPHORIC ACID

Phosphoric acid and phosphates intended for nutritional uses have to comply with extremely strict standards of purity, particularly as far as heavy metals, arsenic and fluorine are concerned. There are indeed simple, effective and inexpensive methods of reducing, to an acceptable level, the quantity of heavy metals and arsenic contained in impure phosphoric acids, e.g. acids obtained by a wet process. However, there are no known means for adequate elimination of fluorine impurities; the fluorine content should not exceed 10 p.p.m. relative to $P_2O_5$.

Most of the phosphate ores, which are commonly used as raw materials, contain a relatively large quantity of fluorine compounds, chiefly in the form of calcium fluoride; after treatment, these compounds appear in the crude acid obtained by a wet process, chiefly in the form of hydrofluoric acid (HF), fluosilicic acid ($H_2SiF_6$) and other less well known forms.

Some of the fluorine compounds are known to be eliminated in the vapors which are given off when phosphates are acted on by acids at temperatures of about 80° C or more. When crude phosphoric acid is concentrated, the water vapor eliminated is also known to entrain a proportion of the same fluorine compounds.

It is also known to eliminate an additional quantity of the fluorine compounds by bubbling air or water vapor into the concentrated acid.

Furthermore it is known to eliminate alkali metal fluosilicates, which are relatively insoluble in phosphoric acid, by filtering after adding an alkaline compound and possibly silica. By these means, the quantity of fluorine in the acid can be reduced, e.g. to 0.2%, a level which is still very high. This is why known methods of eliminating fluorine in the form of alkali metal fluosilicates are applied particularly to the preparation of acid for the manufacture of non-nutritional alkaline phosphates.

Then again, present day industrial processes for purifying phosphoric acid by liquid-liquid extraction by means of solvents are not generally found to eliminate sufficient fluorine. Thus, extraction by tributyl phosphate leaves about 0.5% of fluorine in the phosphoric acid and extraction by isoamyl alcohol about 0.3%, while most of the impurities due to heavy metals are eliminated in the aqueous phase. The impossibility of additional purification can be explained by the hypothesis that there is not sufficient difference of affinity for the solvent between the phosphoric acid and the fluorine compounds in their various forms. The fluorine compounds are not eliminated to any greater degree during washing or regeneration.

Washing is understood as being a counter-current treatment of the solvent with a moderate flow of an aqueous solution, enabling some types of compound contained in the solvent to be selectively eliminated. Regeneration is understood to mean treatment with an aqueous solution under conditions of flow, in multiple stages and composition which will enable all the types of compound contained in the solvent, including the phosphoric acid, to be removed in the aqueous phase. The quantity of fluorine remaining in the phosphoric acid after regeneration cannot be easily or economically eliminated without resorting to expensive physical treatment by distillation or removal by vapor.

The method of the invention is distinguished from known methods, in that it has recourse only to chemical treatments at normal temperature. It makes it possible to defluorinate impure phosphoric acid, such as crude acid obtained by a wet process, containing fluorine compounds is relatively large quantities, e.g. about 0.3% or more by weight of fluorine, relative to phosphoric acid, expressed as $P_2O_5$.

The method of the invention comprises two stages. In the first stage, phosphoric acid, in solution in an substantially water insoluble organic solvent and which has sufficient affinity to the phosphoric acid, is washed with an aqueous solution of a soluble compound of one of the metals Al, Fe, Ti or Zr. An aqueous phase containing extracted fluorine compounds is then separated, and an organic phase containing the phosphoric acid is collected. In the second stage the phosphoric acid is separated from the organic solvent, and a solution of phosphoric acid is collected as the final product. Its fluorine content is less than 10 p.p.m. relative to the $P_2O_5$.

Operation is usually continuous, and the first stage in the method of the invention is preferably carried out by counter-current washing with an aqueous solution of a soluble aluminum salt or a soluble iron salt. The salt is preferably a phosphate which is soluble in an excess of phosphoric acid.

Generally speaking, it is possible to use any organic solvents which are substantially water immiscible and which have sufficient affinity for phosphoric acid. Aliphatic alcohols containing 4 to 8 carbon atoms or phosphoric esters are preferred. Isobutyl alcohol may advantageously be selected. Of the phosphoric esters, it is preferable to select tributyl phosphate.

An advantageous embodiment of the first stage uses phosphoric acid in solution in isobutyl alcohol and an aqueous solution containing 0.1 to 5% by weight of an aluminum compound, expressed as $Al_2O_3$, and 21 to 38% by weight of phosphoric acid, expressed as $P_2O_5$. The solution is advantageously prepared by dissolving synthesized hydrated alumina Al (OH)$_3$ in purified, preferably concentrated phosphoric acid, such as the acid produced in the method of the invention, part of which is set aside.

In another advantageous embodiment of the first stage, use is made of phosphoric acid in solution in tributyl phosphate and an aqueous solution of substantially the same composition as before.

The first stage in the process is carried out in any known liquid-liquid extracting apparatus with a plurality of stages, such as a decanting mixer or a bubble cap or contact column.

At the end of the first stage of the process, there seperated an aqueous phase, and an organic phase containing the phosphoric acid. In the second stage, the phosphoric acid is separated from the solvent in the separated organic phase.

The second stage of the process is carried out by regeneration, preferably with water, then the solvent is recovered and the purified aqueous phosphoric solution collected.

It has sometimes been found advantageous to carry out the second stage in two steps. The solvent phase is then treated firstly by washing with a moderate quantity of water, then by regeneration with a larger quantity of water, in counter-current flow, e.g. in a multistage apparatus. For example, quantities of 1 to 5 parts by weight of water per 100 parts by weight of solvent may be used for washing, and 15 to 30 parts by weight of water per 100 parts of solvent for regeneration.

The aqueous solution of phosphoric acid obtained is of a concentration of up to 15 to 16%. It is advantageous to concentrate it by any known means, e.g. a vacuum concentrating apparatus, thus enabling the strength to be increased e.g. to 54%.

The final product, from the end of the first stage, is found to contain less than 10 p.p.m. of fluorine. The phosphoric acid/hydrofluoric acid and phosphoric acid/fluosilicic acid separation factors are, in fact, found to be very substantially increased in the presence of an aqueous washing solution according to the invention, and the composition of the washing solution for the first stage is selected according to the separation factors. In particular, separation factors have been determined for the case where a crude 25% phosphoric acid is used in 3% solution in isobutyl alcohol; it has been discovered that, for concentrations below 1% of alumina, the separation factors do not provide worthwhile separation, whereas at concentrations of over 5%, precipitation of aluminum phosphate is observed. Although the presence of this precipitate does not prevent the process from being carried out without going beyond the scope of the invention, a solution containing from 0.2 to 5% of alumina is usually preferred.

After the first stage in the process of the invention, one is left with an aqueous phase containing virtually all the fluorine compounds. This phase can be eliminated as it is, or after a purifying treatment known per se. It may equally be used as a phosphate-containing ore in the manufacture of phosphoric acid by a wet process. It has been found advantageous to treat the aqueous phase by the following method. This embodiment is a modification of the method of the invention. A strong acid, such as sulphuric, is added to the said aqueous phase in a stoichiometric quantity relative to the metal selected from the group Al, Fe, Ti and Zr; the compounds formed on the basis of phosphoric, fluorine and aluminum ions are thus decomposed, liberating phosphoric acid and forming a soluble salt, such as aluminum sulphate; the solution obtained is added to impure phosphoric acid and the mixture is treated with an organic solvent as defined above; liquid-liquid extraction is carried out; the aqueous phase produced by extraction is eliminated and the organic solvent phase is recycled to the first stage of the process.

Liquid-liquid extraction is preferably carried out by the method taught in the copending application Ser. No. 549,470, filed Feb. 13, 1975. By this method very pure phosphoric solutions are prepared from impure phosphoric acid obtained by a wet process, through a treatment which eliminates the majority of its cationic impurities, such as compounds of iron, chromium and aluminum. The treatment comprises the following sequence of operations. Firstly, the impure phosphoric acid is extracted in counter-current flow in the presence of sulphuric acid and water, by means of an organic solvent which is only slightly miscible with water, so as to eliminate metallic impurities in the discarded aqueous phase. Secondly, the phosphoric acid is brought into contact in the selected organic solvent in the presence of sulphuric acid, by means of an aqueous solution containing phosphate ions and calcium ions in solution. The solution is prepared from calcium phosphate, phosphoric acid and water, in respective quantities such that the content of calcium ions in solution is from 2 to 6% by weight, expressed as CaO. The sulphate ions are accordingly precipitated in the form of calcium sulphate when the substances are brought into contact. They are then put into suspension in the said solution and solution is separated. After this treatment one is left with phosphoric acid in the organic solvent, and this is subjected to the first stage of the process of the invention.

In this way all the phosphoric acid which was used in preparing the washing solution for the first stage is recovered in the solvent phase, in the form of purified phosphoric acid.

An aliphatic alcohol containing 4 to 8 carbon atoms is preferably selected; among these alcohols it is advantageous to select isobutyl alcohol.

In order to reduce the amount of alumina consumed in defluorination and thus to make the extracting installation smaller, it is advantageous to minimize the quantity of fluorine present in the wet process phosphoric acid which has to be treated. In such instance, it is advantageous to carry out a first purification step by causing the fluorine compounds to be precipitated in the form of sodium fluosilicates, by a known method. For this purpose, depending on the composition of the crude acid, one should add either a sodium compound or a compound of sodium and silica or a sodium silicate, the quantity added being calculated so that the maximum amount of fluorine is precipitated. For reasons of convenience, the time generally selected to add the compounds is when the ore is being treated. Sodium fluosilicate is precipitated and is eliminated at the same time as the calcium sulphate, generally by filtration. The fluorine content of the filtered acid is then greatly reduced and corresponds to the solubility of the sodium fluosilicate.

Figure 2:
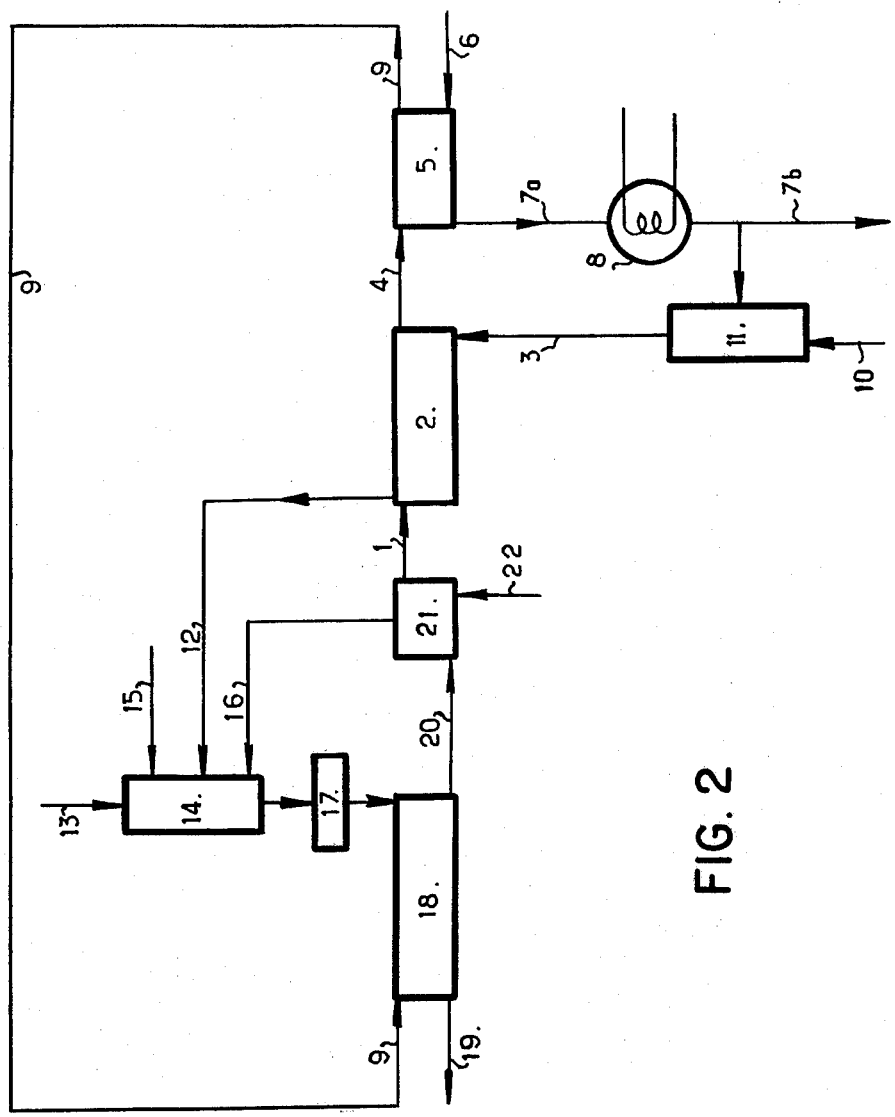

The invention will be understood better from the description of the accompanying drawings, in which FIG. 1 is a flow diagram showing the essential feature of the process of this invention; and FIG. 2 is a composite flow diagram which includes the process of this invention.

FIG. 1: The solvent phase, containing the phosphoric acid in solution, is shown diagrammatically at 1 and is fed into the extraction apparatus 2, where it is washed in counter-current flow with the solution introduced at 3. The solvent phase, which leaves the extracting apparatus at 4, contains phosphoric acid separated from the aqueous phase. It is fed into the washing and regenerating apparatus 5 where it is washed in counter-current flow with water introduced at 6. An aqueous solution of dilute phosphoric acid is colleced at 7a and concentrated to the desired strength in the apparatus shown diagrammatically at 8. A purified, concentrated phosphoric acid, representing the final product, is obtained at 7b and the separated solvent is drawn off at 9. Part of the product 7b is drawn off and combined with alumina 10 in apparatus 11 to form the washing solution which is introduced at 3. An aqueous phase containing the fluorine compounds is collected at 12.

FIG. 2 diagrammatically shows the whole apparatus which makes it possible to treat the aqueous solution 12 containing the fluorine compounds and to recycle it into the phosphoric acid purifying process of the aforementioned application Ser. No. 549,470. The method of this application is to treat crude phosphoric acid obtained by a wet process. It is introduced at 13 into a contact tower 14. Here it is brought into contact with sulphuric acid introduced at 15, with an aqueous suspension emanating from the subsequent desulphating stage and introduced at 16, and with an aqueous solution from the subsequent defluorinating stage 12. On leaving the apparatus 14 the phosphoric acid is sent to a conventional filter 17; then, after filtration, to an extraction apparatus 18 into which the organic solvent 9 is fed in counter-current flow. After leaving the extraction apparatus 18, an aqueous phase containing the metallic impurities is eliminated at 19 and an organic extract of phosphoric acid is collected at 20. This extract is passed into a desulphating mixer 21 which also receives the aqueous suspension 22, the latter being prepared separately as indicated in the above-mentioned patent application. The desulphating mixer 21 discharges an organic extract containing phosphoric acid already purified of its heavy metals. This is fed at 1 into the apparatus 2 to undergo the defluorinating process according to the invention.

The aqueous suspension from the desulphating appratus 21 is returned through 16 and the aqueous solution containing the fluorine compounds is returned through 12 to the apparatus described above.

The advantage of using the modification of the process according to the invention, shown in FIG. 2, is that it directly produces a phosphoric acid freed virtually entirely from the two types of impurities which are most troublesome in nutritive applications.

Phosphoric acid defluorinated by the method of the invention and its modifications can advantageously be applied to nutritive purposes. It can also be applied to industrial fields which require the same degree of purity in respect of fluorine, such as the preparation of products for treating surfaces.

EXAMPLE 1

Crude phosphoric acid obtained by a wet process with 25% of $P_2O_5$, which has been freed from the main cationic impurities and which contains fluorine compounds in quantitites of 0.3% by weight relative to phosphoric acid $H_3PO_4$, is fed into a 7-stage extracting apparatus in the form of a 5% solution in isobutanol. An aqueous solution containing 2% by weight of alumina and 35% of phosphoric acid $H_3PO_4$ is fed into the apparatus in counter-current flow. The alumina is prepared by drawing off part of the phosphoric acid obtained as the final product, containing 54% of $P_2O_5$, and reacting if on "BAYER" hydrate. The ratio of the flow rate of the aqueous phase to that of the solvent is 1/30.

After regeneration of the solvent by water and followed by concentration, a solution of phosphoric acid is obtained containing 54% of $P_2O_5$ and less than 10 p.p.m. of fluorine relative to the $P_2O_5$.

On leaving the extracting apparatus, an aqueous phase is eliminated, containing the fluorine compounds and the phosphoric alumina solution.

By way of comparison, the same phosphoric acid obtained by a wet process and not subjected to the process of the invention, contains 0.1% of fluorine relative to the $P_2O_5$ after being concentrated to 54%.

EXAMPLE 2

The procedure is the same as in Example 1, except that the aqueous phase is collected at the outlet from the extracting apparatus, combined with sulphuric acid and recycled with the crude phosphoric acid. The phosphoric acid which was used for preparing the alumina solution is then recovered in the course of extraction; the only materials consumed are sulphuric acid and "BAYER" hydrate.

By way of comparison, the same phosphoric acid obtained by a wet process and not subjected to the process of the invention contains 0.1% of fluorine relative to the $P_2O_5$ after being concentrated to 54%.

EXAMPLE 3

The starting material is a crude phosphoric acid prepared by a wet process from phosphate from Morocco and containing 27.50% $P_2O_5$, 0.18% ($10^{-2}$ moles)F, 0.039% ($6.5 \times 10^{-4}$ moles) $SiO_2$ and 0.89% ($2.8 \times 10^{-2}$ moles) $Na_2O$. The acid thus has insufficient silica, relative to the fluorine contained, to precipitate $Na_2SiF_6$.

The reaction on the Moroccan phosphate takes place in the presence of sodium silicate in a quantity such that the ratio of $SiO_2$ to the total volume of reacting paste is 0.2%; the filtered acid contains only 0.1% of fluorine.

Under the conditions of equilibrium in the extracting unit 50 mg/liter of fluorine is extracted in isobutanol, instead of 100 mg/liter under normal conditions.

Defluorination is consequently carried out by the method of the invention as in the previous examples, but only half as much alumina is required as would be needed, were it not for the first defluorination by sodium silicate.

After the stages of regenerating the solvent with water and followed by concentration, a solution of $H_3PO_4$ is obtained containing 54% of $P_2O_5$ and less than 10 p.p.m. of fluorine relative to the $P_2O_5$.

EXAMPLE 4

Crude phosphoric acid obtained by a wet process is fed into a 7-stage extracting apparatus in the form of a 5% solution in tributyl phosphate. The acid contains 0.3% by weight of fluorine, in the form of hydrofluoric acid, relative to $P_2O_5$. An aqueous solution, prepared as before and containing 3% by weight of alumina and 41% of phosphoric acid $H_3PO_4$, is fed into the apparatus in counter-current flow.

The procedure is the same as in Examples 1 and 2. After regeneration and concentration a solution of phosphoric acid is obtained, containing less than 10 p.p.m. of fluorine relative to the $P_2O_5$.

We claim:
1. A method of defluorinating phosphoric acid comprising contacting the fluorine containing phosphoric acid in solution in a substantially water immiscible organic solvent with an aqueous medium containing in solution 0.2 to 5% by weight of a soluble compound of a metal selected from the group consisting of Al, Fe, Ti and Zr whereby phosphoric acid remains in the organic solvent while fluorine compounds are extracted from the organic solvent into the aqueous medium, separating the aqueous medium containing the fluorine compound from the organic solution containing the phosphoric acid, regenerating the separated organic solution by contact with an aqueous phase whereby phosphoric acid is extracted from the organic solution into the aqueous phase, and then separating the aqueous phase comprising phosphoric acid in which the fluorine content is less than 10 p.p.m. relative to the $P_2O_5$.

2. The method as claimed in claim 1 in which the soluble compound of a metal is an aluminum compound.

3. The method as claimed in claim 1 in which the soluble compound of a metal is an iron salt.

4. The method as claimed in claim 1 in which the soluble compound of a metal is a metal phosphate which is soluble in an excess of phosphoric acid.

5. The method as claimed in claim 1 in which the organic solvent is an aliphatic alcohol having from 4 to 8 carbon atoms.

6. The method as claimed in claim 1 in which the organic solvent is a phosphoric ester.

7. The method as claimed in claim 2 in which in the water immiscible organic solvent is isobutyl alcohol, and the aqueous medium contains 0.1 to 5% by weight of an aluminum compound, expressed as $Al_2O_3$, and 21 to 38% by weight of phosphoric acid, expressed as $P_2O_5$.

8. The method as claimed in claim 2 in which in the water immiscible organic solvent is tributyl phosphate and is washed in counter-current flow with an aqueous medium containing 0.1 to 5% by weight of an aluminum compound, expressed as $Al_2O_3$, and 21 to 38% by weight of phosphoric acid, expressed as $P_2O_5$.

9. The method as claimed in claim 1 which includes the step of concentrating the aqueous phase comprising phosphoric acid.

10. The method as claimed in claim 1 which includes the step of adding to the aqueous medium separated from the organic solution a strong acid in a stoichiometric amount relative to the metal selected from the group Al, Fe, Ti and Zr, adding the solution formed to an impure phosphoric acid, extracting phosphoric acid from the solution with an organic solvent by liquid-liquid extraction, separating the aqueous phase and the organic phase and recycling the organic phase to the first stage of the method of claim 1.

11. The method as claimed in claim 10 in which the strong acid is sulphuric acid.

12. The method as claimed in claim 11 in which the liquid-liquid extraction is carried out by first passing an impure phosphoric acid in solution in water in counter-current flow with an organic solvent whereby phosphoric acid is extracted from the water solution into the organic solvent, secondly contacting the phosphoric acid in the organic solvent with an aqueous solution containing phosphate ions and calcium ions in solution, the aqueous solution being prepared from calcium phosphate, phosphoric acid and water in amounts such that the content of calcium ion in solution is within the range of 2 to 6% by weight, expressed as CaO, whereby the sulphate ions are precipitated in the form of calcium sulphate, separating the precipitates from the remaining solution of phosphoric acid in an organic solvent, and then passing said organic solvent solution containing phosphoric acid as the fluorine containing phosphoric acid solution in claim 1.

13. The method as claimed in claim 12 in which the solvent is isobutyl alcohol.

* * * * *